United States Patent
Bayazitoglu et al.

(10) Patent No.: US 8,034,134 B2
(45) Date of Patent: Oct. 11, 2011

(54) SPIRAL MICROREFORMER ASSEMBLY

(75) Inventors: Yildiz Bayazitoglu, Houston, TX (US); Jeremy Gernand, Houston, TX (US)

(73) Assignee: William Marsh Rice University, Houston, TX (US)

( * ) Notice: Subject to any disclaimer, the term of this patent is extended or adjusted under 35 U.S.C. 154(b) by 929 days.

(21) Appl. No.: 11/740,510

(22) Filed: Apr. 26, 2007

(65) Prior Publication Data
US 2010/0028737 A1 Feb. 4, 2010

Related U.S. Application Data

(60) Provisional application No. 60/878,887, filed on Jan. 5, 2007.

(51) Int. Cl.
| | |
|---|---|
| *B01J 7/00* | (2006.01) |
| *H01M 8/06* | (2006.01) |
| *C01B 3/36* | (2006.01) |
| *C01B 3/02* | (2006.01) |
| *C01B 3/24* | (2006.01) |
| *C01B 3/26* | (2006.01) |
| *C10J 3/46* | (2006.01) |
| *C10J 3/54* | (2006.01) |

(52) U.S. Cl. ........ 48/61; 48/197 R; 423/648.1; 423/650; 423/651

(58) Field of Classification Search .......... 48/61, 197 R; 423/644–658
See application file for complete search history.

(56) References Cited

U.S. PATENT DOCUMENTS

| | | | | |
|---|---|---|---|---|
| 6,193,501 | B1 * | 2/2001 | Masel et al. ................. | 431/170 |
| 2002/0098135 | A1 * | 7/2002 | Smalley et al. .............. | 422/222 |
| 2003/0072699 | A1 * | 4/2003 | Tonkovich et al. .......... | 422/190 |
| 2003/0134166 | A1 * | 7/2003 | Skala et al. ................. | 429/17 |
| 2003/0194362 | A1 * | 10/2003 | Rogers et al. ............... | 422/222 |
| 2004/0179980 | A1 * | 9/2004 | Pattekar et al. ............. | 422/130 |
| 2004/0192044 | A1 * | 9/2004 | Degertekin et al. ......... | 438/689 |
| 2005/0023236 | A1 * | 2/2005 | Adams et al. ............... | 215/3 |
| 2005/0031507 | A1 * | 2/2005 | Mae et al. .................. | 422/190 |
| 2005/0223644 | A1 * | 10/2005 | Kim ............................ | 48/198.5 |
| 2005/0282048 | A1 * | 12/2005 | Kamo et al. ................ | 429/12 |
| 2006/0156627 | A1 * | 7/2006 | Brantley et al. ............ | 48/61 |

OTHER PUBLICATIONS

Morini, G. L., "Laminar Liquid Flow Through Silicon Microchannels", J. of Fluids Engr., 2004, 126, 485-489.

Yener, Y. et al., "Single-Phase Forced Convection in Microchannels: A State of . . .", Microscale Heat Transfer, 2005, 1-6, Eds: Kakac, S. et al., Springer, The Netherlands.

Qu, W. et al., "Flow boiling heat transfer in two-phase micro-channel heat sinks—I. Experimental investigation . . .", Int. J. Heat Mass Transfer, 2003, 46, 2755-2771.

Qu, W. et al., "Measurement and prediction of pressure drop in two-phase micro-channel heat sinks", Int. J. Heat Mass Transfer, 2003, 46, 2737-2753.

Lazarek, G. M. et al., "Evaporative Heat Transfer, Pressure Drop and Critical Heat Flux in a Small Vertical Tube with R-113", Int. J. Heat Mass Transfer, 1982, 25, 7, 945-960.

(Continued)

*Primary Examiner* — Matthew Merkling
(74) *Attorney, Agent, or Firm* — Winstead PC

(57) ABSTRACT

A design for a microchannel steam microreformer has been developed to provide power in conjunction with a micro fuel cell for a portable, low-power device. The design is optimized for low pumping power and rapid operation as well as thermal efficiency, overall size, and complete generation of the available hydrogen. The design includes at least one microchannel having a grooved surface with a continuous groove oriented in a spiral configuration.

29 Claims, 5 Drawing Sheets

OTHER PUBLICATIONS

Kandlikar, S. G., "Heat Transfer Mechanisms During Flow Boiling in Microchannels", J. of Heat Transfer, 2004, 126, 8-16.

Tunc, G. et al., "Heat transfer in rectangular microchannels", Int. J. Heat Mass Transfer, 2002, 45, 765-773.

Pattekar, A. V. et al., "A Microreactor for Hydrogen Production in Micro Fuel Cell Applications", J. Microelectromech. Sys., 2004, 13, 1, 7-18.

Pattekar, A. V. et al., "A microreactor for in-situ hydrogen production by catalytic methanol reforming", Proc. of 5th Intl. Conf. on Microreaction Technology, May 2001.

Peles, Y. et al., "Forced convective heat transfer across a pin fin micro heat sink", Int. J. Heat Mass Transfer, 2005, 48, 3615-3627.

Morini, G. L., "Single-phase convective heat transfer in microchannels: a review of experimental results", Int. J. of Thermal Sciences, 2004, 43, 631-651.

Bayazitoglu, Y. et al., "Flow Regimes in Microchannel Single-Phase Gaseous Fluid . . .", Microscale Heat Transfer, 2005, 75-92, Eds.: Kakac, S. et al., Springer, The Netherlands.

Bontemps, A., "Measurements of Single-Phase Pressure Drop and Heat Transfer . . .", Microscale Heat Transfer, 2005, 25-48, Eds.: Kakac, S. et al., Springer, The Netherlands.

Warrier, G. R. et al., "Heat transfer and pressure drop in narrow rectangular channels", Exp. Therm. Fluid Sci., 2002, 26, 53-64.

* cited by examiner

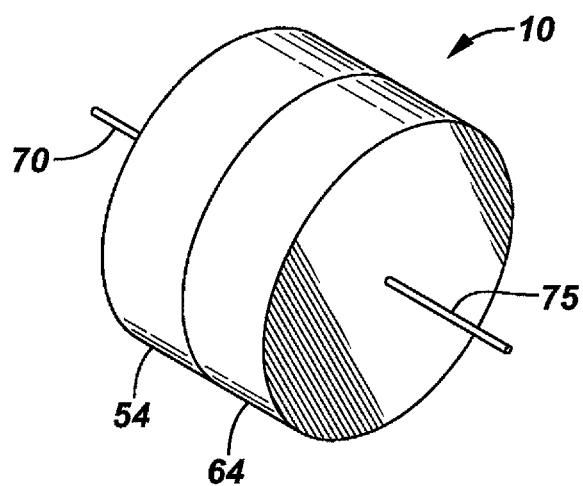
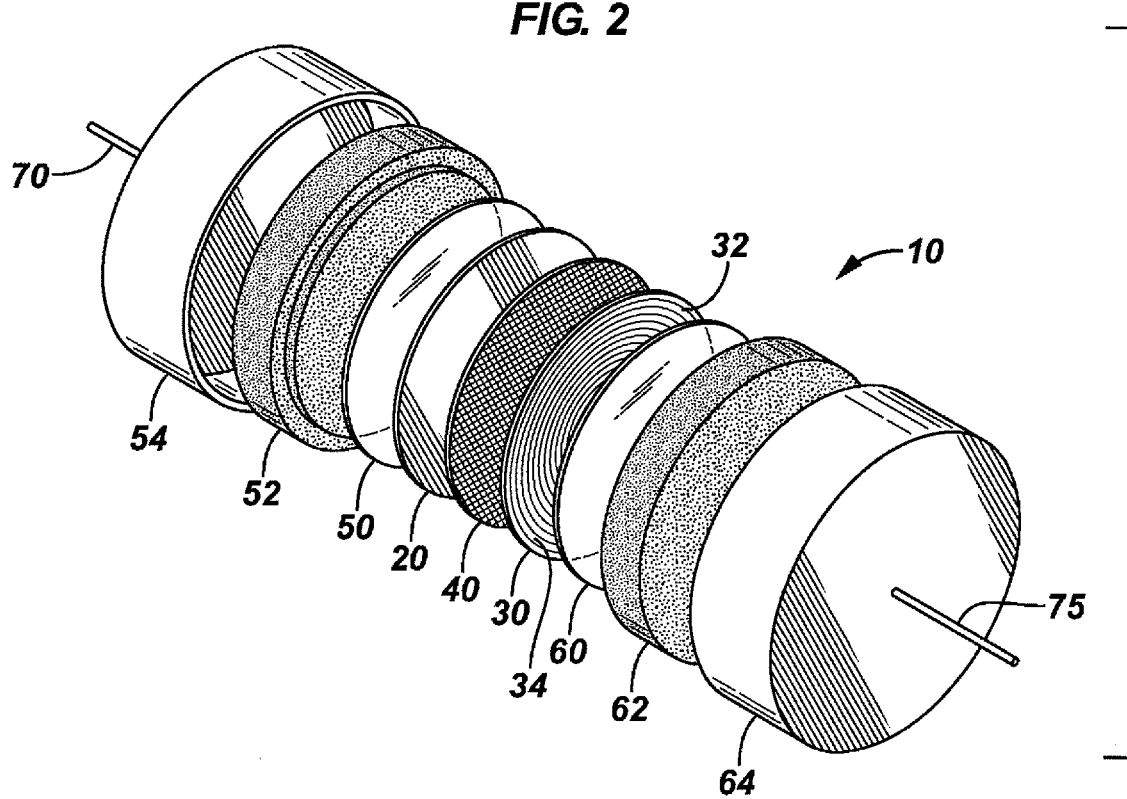

SPIRAL MICROREFORMER ASSEMBLY

CROSS-REFERENCE TO RELATED APPLICATION

This application claims priority to and benefit of U.S. Provisional Application Ser. No. 60/878,887, filed on Jan. 5, 2007, entitled "Spiral Microreformer Assembly", by inventors Bayazitoglu and Gernand.

FIELD OF THE INVENTION

The present invention relates generally to reformers and more particularly to spiral microreformers.

BACKGROUND

As electronic devices become smaller and smaller, there has been an increasing interest in developing miniature fuel cells for applicability to a wide range of portable, electronic devices. These devices desire a certain amount of power, but have very limited space in which to house the power supply unit.

Microscale Proton Exchange Membrane Fuel Cells represent a very promising power source for small, portable, electronic devices. They offer high power capability, energy density, high efficiency, low noise, and little environmental pollution. The byproducts of a hydrogen-based fuel cell system include only water, carbon dioxide and heat. However, hydrogen gas is difficult to store, not very dense, and brings with it some safety concerns due to its high flammability and explosive potential. Thus there remains a need for improved microscale fuel cells and for methods and systems of delivering hydrogen thereto.

BRIEF SUMMARY OF THE INVENTION

A microreformer assembly that comprises a first microchannel. This first microchannel comprises a first grooved surface which comprises a first continuous groove in a spiral configuration.

A microreformer assembly that comprises a first microchannel, a second microchannel, a first catalyst, a second catalyst, a patch heater, a first seal, a first insulation, a second seal, a second insulation, a first exterior packaging, a second exterior packaging, an inlet fuel line and an outlet fuel line. The first microchannel comprises a first grooved surface which comprises a first continuous groove that emanates outwardly in a spiral configuration. The second microchannel comprises a second grooved surface which comprises a second continuous groove that emanates outwardly in a spiral configuration. The second microchannel is in fluid communication with the first microchannel. The first catalyst is coupled to an interior side of the first continuous groove. The second catalyst is coupled to an interior side of the second continuous groove. The patch heater is coupled to the first microchannel on a surface opposite of the first grooved surface and is also coupled to the second microchannel on a surface opposite of the second grooved surface. The first seal is coupled to the first microchannel on the first grooved surface, while the second seal is coupled to the second microchannel on the second grooved surface. The first insulation is coupled to the first seal. The second insulation is coupled to the second seal. The second exterior packaging is coupled to the first exterior packaging so as to enclose the first insulation, the first seal, the first microchannel, the patch heater, the second microchannel, the second seal and the second insulation. The inlet fuel line is coupled to the first continuous groove. The outlet fuel line is coupled to the second continuous groove.

A microreformer system that comprises a microreformer assembly. The microreformer assembly comprises a first microchannel that comprises a first grooved surface. The first grooved surface comprises a first continuous groove in a spiral configuration.

The foregoing has outlined the features and technical advantages of the present invention in order that the detailed description of the invention that follows may be better understood. Additional features and advantages of the invention will be described hereinafter which form the subject of the claims of the invention.

BRIEF DESCRIPTION OF DRAWINGS

The following detailed description of the preferred embodiment of the invention will be better understood when read in conjunction with the appended drawings. It should be understood, however, that the invention is not limited to the precise arrangements and instrumentalities shown herein. The components in the drawings are not necessarily to scale, emphasis instead being placed upon clearly illustrating the principles of the present invention. Moreover, in the drawings, like reference numerals designate corresponding parts throughout the several views.

The invention may take physical form in certain parts and arrangement of parts. For a more complete understanding of the present invention, and the advantages thereof, reference is now made to the following descriptions taken in conjunction with the accompanying drawings, in which:

FIG. 1 illustrates the assembled view of a microreformer assembly according to some embodiments of the present invention;

FIG. 2 illustrates the internal parts' configuration of the microreformer assembly according to some embodiments of the present invention;

DETAILED DESCRIPTION

Figure 3:
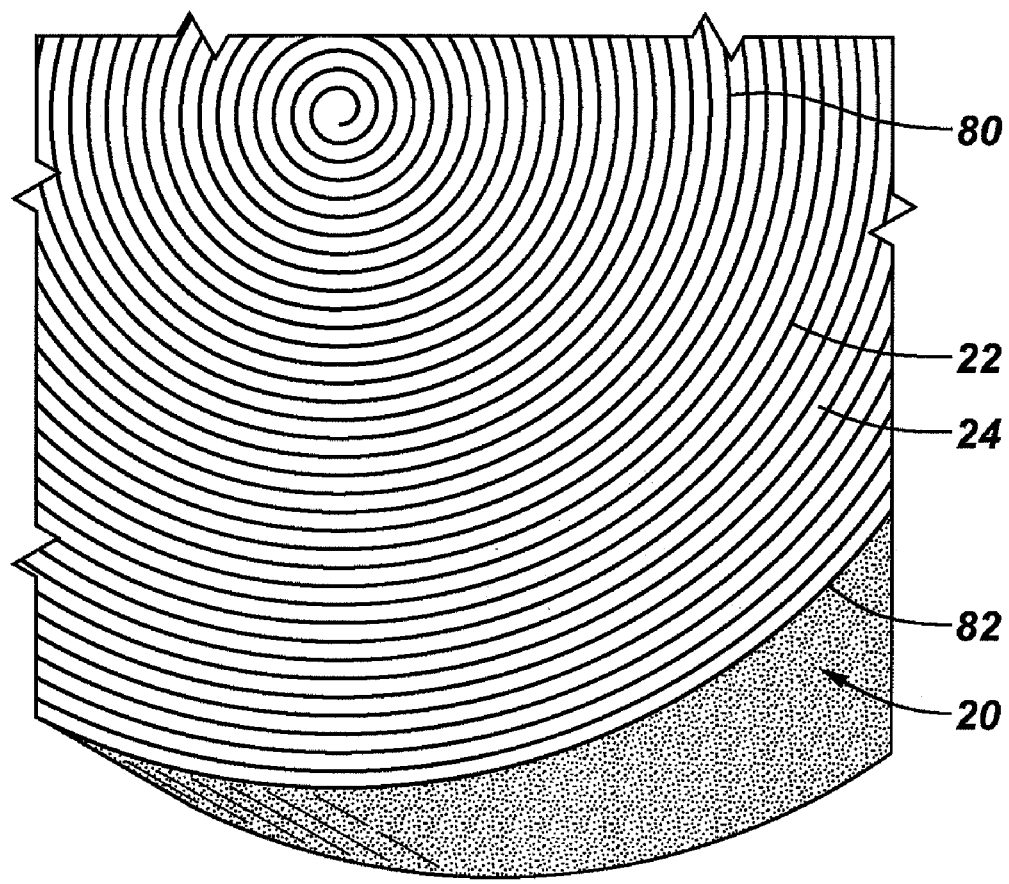
FIG. 3 illustrates the first microchannel configuration of the spiral microchannel according to some embodiments of the present invention.

The following discussion is presented to enable a person skilled in the art to make and use the invention. The general principles described herein may be applied to embodiments and applications other than those detailed below without departing from the spirit and scope of the present invention as defined by the appended claims. The present invention is not intended to be limited to the embodiments shown, but is to be accorded the widest scope consistent with the principles and features disclosed herein.

As such, those skilled in the art may appreciate that the conception, upon which this disclosure is based, may readily be utilized as a basis for the designing of other structures, methods, and devices for carrying out the several purposes of the present invention. It is desirable, therefore, that the claims be regarded as including such equivalent constructions insofar as they do not depart from the spirit and scope of the present invention.

It is a desire of the present invention to provide a microreformer for providing hydrogen to a micro fuel cell. It is another desire of the present invention to reduce carbon monoxide formation and reduce the pressure drop across the microreformer. It is yet another desire to provide a microreformer that is part of a power system for small portable electronic devices. It is yet another desire of the present invention to provide a microreformer wherein the design is optimized for low pumping power and rapid operation as well as thermal efficiency, overall size, and complete generation of the available hydrogen.

Some embodiments of the present invention, as described herein, comprise a microreformer assembly that is designed to generate about 1.5 W total gross power. These embodiments generate a net power output (including the micro fuel cell inefficiencies) of about 0.63 W. Alternative design embodiments may be scaled up for a variety of power levels, up to about 20 W total gross power, or scaled down to about 0.1 W without departing from the scope and spirit of the present invention. Some of the possible applications for this microreformer include the powering of pagers, cell phones, PDAs, notebook computers, satellite phones and other portable devices or devices that are desired to be made portable.

Some embodiments, as described herein, also utilize about a 1:1 molar water to methanol mixture as a fuel supply. Alternatively, other molar ratios varying from about 1:1 to about 2:1 water to methanol may be used without departing from the scope and spirit of the present invention. Also, other hydrocarbons or alcohols, including ethanol, propanol, butanol or any other alcohol capable of producing hydrogen gas in the presence of a catalyst, may be used for reforming without departing from the scope and spirit of the present invention. One advantage of using methanol is that it may be reformed at significantly lower temperatures, about 200° C. Another advantage is that methanol reforming in the presence of water produces carbon dioxide in addition to hydrogen gas, along with very small amounts of carbon monoxide.

FIG. 1 illustrates the assembled view of microreformer assembly 10 according to some embodiments of the present invention. This view shows first exterior packaging 54 coupled to second exterior packaging 64 having outlet fuel line 75 extending outward from the surface of second exterior packaging 64. In some embodiments, outlet fuel line 75 is located substantially in the center of the surface of second exterior packaging 64. Although some embodiments depict outlet fuel line 75 to be located substantially in the center of the surface of second exterior packaging 64, other embodiments may have outlet fuel line 75 located anywhere along the surface of second exterior packaging 64 without departing from the scope and spirit of the present invention.

Some embodiments depict the shape of microreformer assembly 10 to be substantially cylindrical. For an exemplary design case of producing 1.5 W total gross power, the height is about 17 mm and the diameter is about 34.2 mm. The total external height of microreformer assembly 10 may range from about 10 mm to about 50 mm. The total external diameter of microreformer assembly 10 may range from about 15 mm to about 120 mm. As the desired production of the total gross power increases, the overall dimension of microreformer assembly 10 may also increase. Although some embodiments utilize a substantially cylindrical shape for the microreformer, other geometrical shapes may be used, including rectangular, triangular, trapezoidal and parallelograms, without departing from the scope and spirit of the present invention. The material of first exterior packaging 54 and second exterior packaging 64 may be constructed of polymers or any other standard packaging materials that may be used for microelectromechanical systems (MEMS).

For an exemplary design case of producing 1.5 W total gross power, the outlet fuel line's 75 diameter is about ½ mm, or about 500 µm. Although a ½ mm diameter tubing has been used for the outlet fuel line, the diameter may range from about 40 µm to about 1000 µm without departing from the scope and spirit of the present invention.

FIG. 2 illustrates the configuration of internal parts of the microreformer assembly 10 according to some embodiments of the present invention. Microreformer assembly 10 comprises patch heater 40, first microchannel 20, first seal 50, first insulation 52, first exterior packaging 54, inlet fuel line 70, second microchannel 30, second seal 60, second insulation 62, second exterior packaging 64 and outlet fuel line 75.

Referring to FIG. 3, first microchannel 20 has first grooved surface 22, wherein first grooved surface 22 has first continuous groove 24 in a spiral configuration.

The spiral geometry of first continuous groove 24 permits a very efficient use of space for providing the proper length of first continuous groove 24 in some embodiments, which is about 2.1 m. Additionally, the spiral geometry reduces the amount of pressure required to drive the fuel through microreformer assembly 10. Although the length of first continuous groove 24 is about 2.1 m in some embodiments, the length may increase or decrease depending on the width and height of first continuous groove 24 without departing from the scope and spirit of the present invention. As the width and height increases, the length decreases. The length may also increase or decrease depending on the required power production without departing from the scope and spirit of the present invention. As the required power production increases, the length also increases while maintaining the same width and height sizes.

Still referring to FIG. 3, the spiral geometry of first continuous groove 24 emanates outwardly from substantially the center of first grooved surface 22 of first microchannel 20. The width of first continuous groove 24 increases as first continuous groove 24 emanates outwardly of first grooved surface 22. Although some embodiments have the spiral geometry of first continuous groove 24 emanating outwardly, the spiral geometry may emanate inwardly without departing from the scope and spirit of the present invention. Also, although some embodiments use first continuous groove 24 which increases in width as it emanates outwardly, the width may remain the same size without departing from the scope and spirit of the present invention.

This first continuous groove 24 is manufactured using a rectangular pattern. Alternatively, other geometrical patterns, including triangular and trapezoidal, may be used without departing from the scope and spirit of the present invention.

In some embodiments, first microchannel 20 is made of silicon. Alternatively, other materials capable of performing reformation may be used, including glass and high-temperature polymers, without departing from the scope and spirit of the present invention.

Referring again to FIG. 2, microreformer assembly 10 may further comprise second microchannel 30 having second grooved surface 32, wherein second grooved surface 32 has second continuous groove 34 in a spiral configuration, and wherein second microchannel 30 is in fluid communication with first microchannel 20. In some embodiments, the characteristics of second microchannel 30, with respect to the materials of construction and the spiral geometry, are similar to the characteristics of first microchannel 20. As with first microchannel 20, the materials of construction and the spiral geometry may vary, as described above, without departing from the scope and spirit of the present invention. Also, the total linear spiral groove length, which includes the length of first continuous groove 24 (FIG. 3) and second continuous groove 34, may range from about 0.5 m to about 2500 m.

Figure 7:
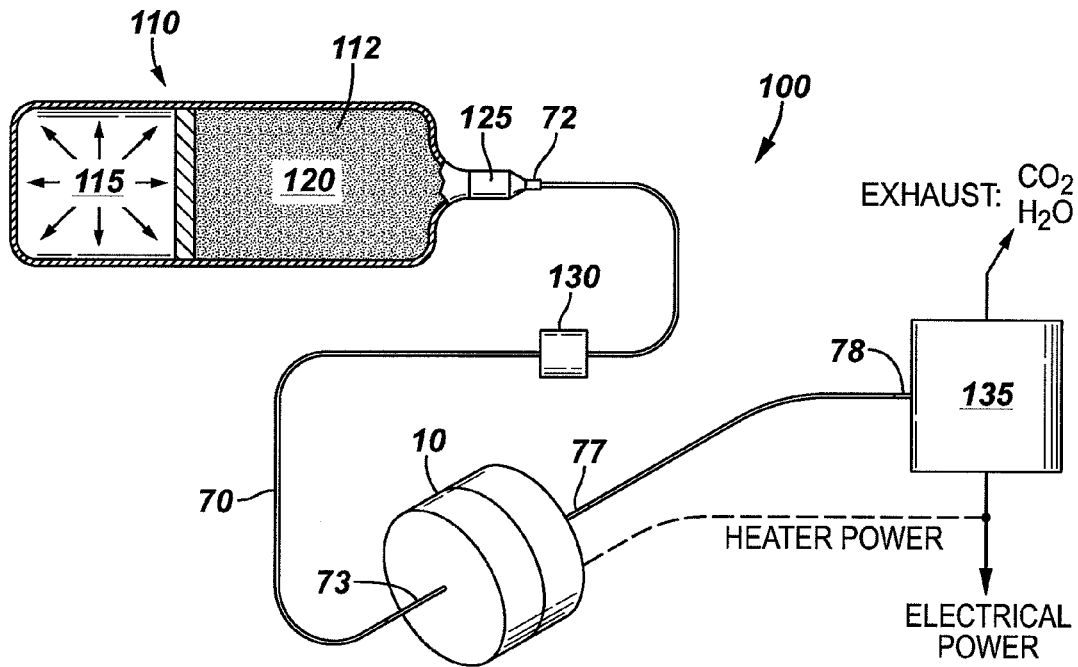
FIG. 7 illustrates a microreformer system according to some embodiments of the present invention.

In some embodiments, the fuel is designed to enter substantially the center of first microchannel 20 via inlet fuel line 70 and then spirally flows outward towards the perimeter of first microchannel 20 via first continuous groove 24 (FIG. 3). In some embodiments, inlet fuel line 70 is coupled to first continuous groove 24. The fuel then exits first microchannel 20 around its perimeter and then enters second microchannel 30 around its perimeter. The fuel then spirally flows inward towards substantially the center of second microchannel 30 via second continuous groove 34. The fuel then exits second microchannel 30 via outlet fuel line 75 and proceeds to micro fuel cell 135 (FIG. 7). Outlet fuel line 75 is coupled to second continuous groove 34. Although some embodiments depict inlet fuel line 70 to be located substantially in the center of the surface of first exterior packaging 54, other embodiments may have inlet fuel line 70 located anywhere along the surface of first exterior packaging 54 without departing from the scope and spirit of the present invention.

Also, although some embodiments depict first microchannel 20 and second microchannel 30 to be positioned in series such that the fuel travels through one microchannel and then the other microchannel, first microchannel 20 and second microchannel 30 may be positioned in parallel such that inlet fuel line 70 is branched so that the fuel enters both first microchannel 20 and second microchannel 30 having substantially the same properties and outlet fuel line 75 is also branched so that the fuel exiting first microchannel 20 and second microchannel 30 merges back into single outlet fuel line 75 without departing from the scope and spirit of the present invention. It is also understood that alternative embodiments may have a single spiraled microchannel or a plurality of microchannels without departing from the scope and spirit of the present invention.

Microreformer assembly 10 may further comprise patch heater 40, first seal 50, first insulation 52, second seal 60 and second insulation 62. Patch heater 40 is coupled to first microchannel 20 on the surface opposite of first grooved surface 22 (FIG. 3) and is also coupled to second microchannel 30 on the surface opposite of second grooved surface 32. In the 1.5 W total gross power design, patch heater 40 should have an output of 0.446 W plus the heat lost to the environment to balance the inputs and outputs. In some embodiments, a disk-type heating element was used. Although a disk-type heating element was used, any other heating element, including paste, trace and other materials capable of heating and conducting, may be used without departing from the scope and spirit of the present invention.

First seal 50 is coupled to first microchannel 20 on first grooved surface 22 (FIG. 3) so that it encloses first continuous groove 24 (FIG. 3) and serves as a housing for the fuel flow. Likewise, second seal 60 is coupled to second microchannel 30 on second grooved surface 32 so that it encloses second continuous groove 34 and serves as a housing for fuel flow. In some embodiments, first seal 50 and second seal 60 may be fabricated of Pyrex®. Although Pyrex® is used as the seals, other materials capable of withstanding about 200° C. and the reformation process, including glass, silicon and certain polymers, may be used without departing from the scope and spirit of the present invention.

First insulation 52 is coupled to first seal 50 and to first exterior packaging 54. Likewise, second insulation 62 is coupled to second seal 60 and to second exterior packaging 64. These insulations protect the high temperature components from touch temperature hazards and eliminate excessive heat loss from the greater part of the component volume. The insulation materials for first insulation 52 and second insulation 62 may be Pyrex®, Teflon® PFA, glass foam, air, aerogel with carbon or any other material with low thermal conductivities capable of reducing the about 200° C. operating temperature to a touch temperature of about 45° C. without departing from the scope and spirit of the present invention. Insulation for microreformer assembly 10 effects the efficiency as the greatest amount of heat used by microreformer assembly 10 is lost to the environment. The amount of insulation used should be balanced because the size of the device will increase as more insulation is used, which eventually makes microreformer assembly 10 too large for many portable electronic applications. Additionally, alternative embodiments may use insulation not only within microreformer assembly 10, but also surrounding microreformer assembly 10 without departing from the scope and spirit of the present invention. Although some embodiments use insulation to reduce the amount of heat loss to the environment, other devices or methods may be used, including fuel preheating, enclosing the microreformer in an evacuated capsule with radiation barriers and enclosing the microreformer within a vacuum, without departing from the scope and spirit of the present invention.

First exterior packaging 54 and second exterior packaging 64 are coupled together such that patch heater 40, first microchannel 20, first seal 50, first insulation 52, second microchannel 30, second seal 60 and second insulation 62 are enclosed within.

Referring to FIG. 2 and FIG. 3, although FIG. 3 illustrates the configuration of first microchannel 20, the configuration of second microchannel 30 is substantially the same. An additional factor to consider in the optimal layout of first continuous groove 24 and second continuous groove 34 of microreformer assembly 10 is internal wall thickness 80 and external wall thickness 82. Internal wall thickness 80 and external wall thickness 82 is desirably designed to resist the internal pressure applied to the fuel to force it through microreformer assembly 10. A thickness greater than is optimal may increase the size of the device making the system less efficient. Optimal internal wall thickness 80 was determined to be about 40 μm, while optimal external wall thickness 82 was determined to be about 70 μm. The internal grooves are desirably designed to withstand at least the pressure differential caused by fuel flow around one rotation of the spiral. Although some embodiments have optimal internal wall thickness 80 of about 40 μm and optimal external wall thickness 82 of about 70 μm, these wall thicknesses may increase or decrease, depending upon the efficiency desired, the total gross power output designed, and many other design choices, without departing from the scope and spirit of the present invention. The internal wall thickness may range from about 30 μm to about 150 μm. The external wall thickness may range from about 30 μm to about 250 μm. The width of first continuous groove 24 and second continuous groove 34 is designed to be about 255 μm. The width of first continuous groove 24 and second continuous groove 34 may be increased or decreased, depending on the efficiency desired, the total gross power output designed and many other design choices, without departing from the scope and spirit of the present invention. The width of first continuous groove 24 and second continuous groove 34 may range from about 40 μm to about 1000 μm.

Figure 4:
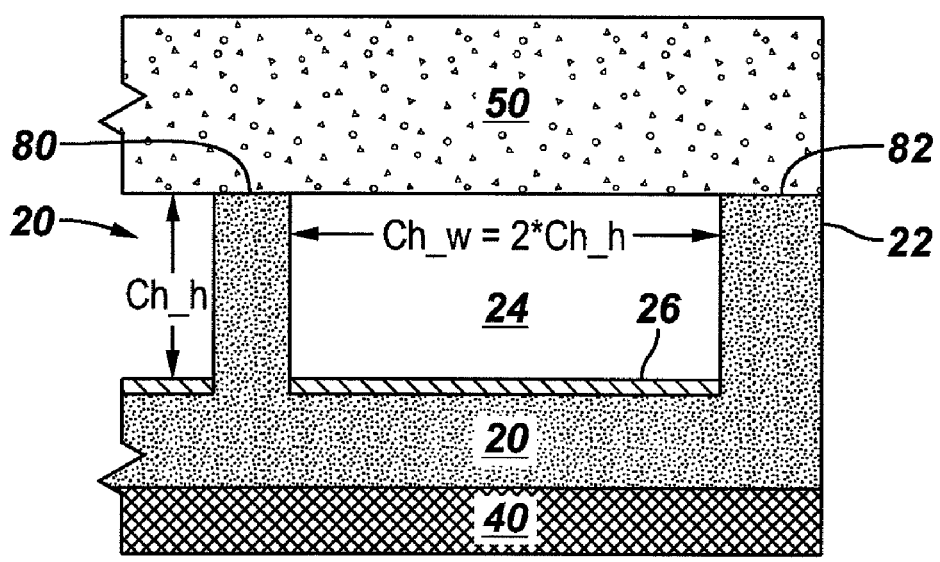
FIG. 4 illustrates a cross section of the first microchannel configuration, which has a catalyst layer deposited on the first continuous groove's floor according to some embodiments of the present invention.

FIG. 4 illustrates a cross section of the first microchannel configuration, which has a catalyst layer deposited on the first continuous groove's floor according to some embodiments of the present invention. Although FIG. 4 illustrates the configuration of first microchannel 20, the configuration of second microchannel 30 is substantially the same. This cross-section shows first continuous groove 24 which has been etched into first microchannel 20. This portion of first continuous groove 24 is bordered by external wall 82 and internal wall 80. The width of first continuous groove 24, 255 μm for some embodiments' design case, is about two times the height of first continuous groove 24. First seal 50 is coupled to the top surface of the wall of first continuous groove 24 to provide a seal and prevent leakage of the fuel from first microchannel 20. Patch heater 40 is coupled to the opposite surface of first grooved surface 22. Catalyst 26 is deposited on the surface of the floor of first continuous groove 24. Catalyst 26 used in some embodiments is Cu/ZnO (copper-zinc oxide), which allows the operating temperature to remain between about 200° C. and about 250° C. Although Cu/ZnO was used as the catalyst in the design case, other catalysts may be used, including noble metal catalysts incorporating platinum or palladium and other catalysts used for reforming an alcohol-water mixture, without departing from the scope and spirit of the present invention.

The conversion efficiency reliability of the device may increase by increasing the catalytic surface area. Thus, other embodiments may have catalyst 26 deposited, not only on the floor of first continuous groove 24, but also on both sides of the wall of first continuous groove 24 without departing from the scope and spirit of the present invention. Alternative embodiments may include highly ordered arrays of carbon nanotubes with catalyst 26 metal deposited on their surface or carbon nanotube bundles with catalyst 26 metal deposited on their surface, which are more resistant to damage during their manufacturing process, coupled to the interior of first continuous groove 24. Yet, other embodiments may utilize fins, nozzles or any other heat transfer enhancements within first continuous groove 24, so as to increase the surface area and therefore improve the efficiency of microreformer assembly 10 (FIG. 1), without departing from the scope and spirit of the present invention. Although the portion of the detailed description is describing catalyst 26 on first continuous groove 24, this description also applies to second continuous groove 34.

Figure 5:
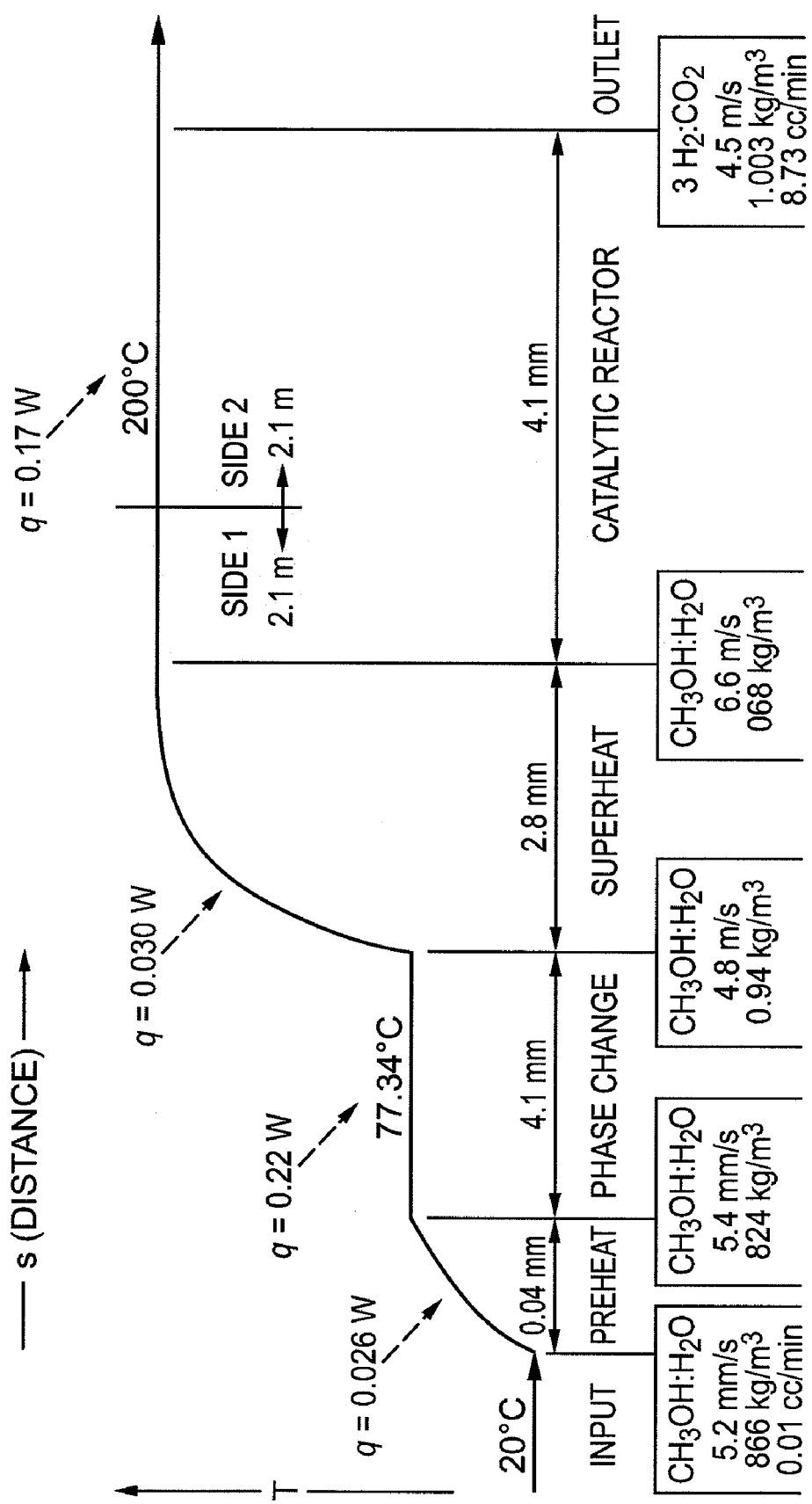
FIG. 5 illustrates the microreformer's performance through each of the four stages of distinct flow properties according to some embodiments of the present invention.

FIG. 5 illustrates the microreformer's performance through each of the four stages of distinct flow properties according to some embodiments of the present invention. In some embodiments, the microreformer's design is optimized for overall performance by taking into account the four stages of distinct flow properties. In some embodiments, where the design case is 1.5 W and the fuel is about a 1:1 water to methanol molar ratio, the liquid fuel is shown to enter first microchannel 20 (FIG. 3) at about 20° C. About 0.026 W is added to the liquid fuel, wherein the liquid fuel is preheated to about 77.34° C. within a traveling distance of about 0.04 mm. The liquid fuel then absorbs about an additional 0.22 W to convert the liquid fuel to vapor fuel within a traveling distance of about 4.1 cm. The vapor fuel then absorbs about an additional 0.03 W to superheat the vapor fuel to about 200° C. within a traveling distance of about 2.8 cm. The superheated vapor fuel then travels about 2.0 m within first microchannel 20 (FIG. 3) before entering second microchannel 30 (FIG. 2). The superheated vapor fuel travels about 2.1 m in second microchannel 30 (FIG. 2) before exiting microreformer assembly 10 (FIG. 2). While the superheated vapor fuel travels within first microchannel 20 (FIG. 3) and second microchannel 30 (FIG. 2), it absorbs about an additional 0.17 W.

Figure 6:
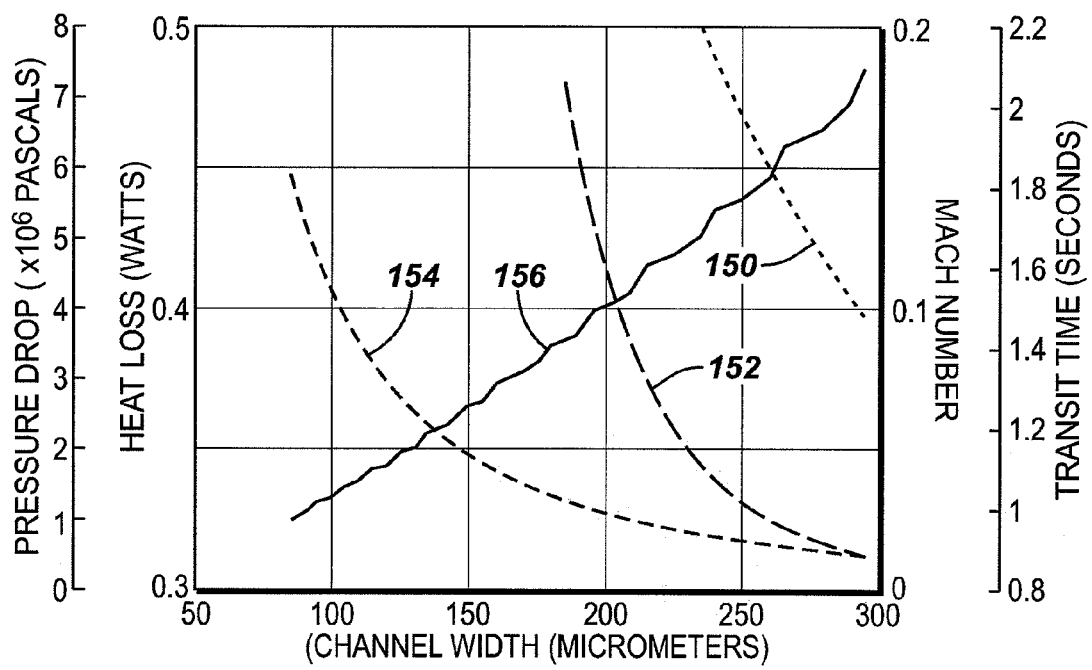
FIG. 6 is a graph of various fuel property comparisons for optimizing the microchannel geometry in a 1.5 W (watt) design case according to some embodiments of the present invention.

FIG. 6 is a graph of various fuel property comparisons for optimizing the microchannel geometry in a 1.5 W design case according to some embodiments of the present invention. The results for the fuel properties are determined by computer analysis and their interactions, as applicable, are used to compare and determine the most appropriate configuration and dimensions for the desired power level to be produced. This optimization plot overlays the graphs for a) heat loss v. channel width (also referred to as "continuous groove width") 150, b) pressure drop v. channel width 152, c) Mach number v. channel width 154 and d) transit time v. channel width 156. For optimization, all the values should be minimized.

According to the results of FIG. 6, which is the 1.5 W design case, a continuous groove width of greater than about 185 μm is desirable to limit the total pressure drop to less than about 8.27 MPa. Additionally, a continuous groove width of greater than about 235 μm is desirable to limit heat loss to less than about 0.5 W. Moreover, a continuous groove width of less than about 295 μm is desirable to limit fuel transit time to less than about two seconds. It is desirable that the electronic device's operator not wait too long between the time the operator activates the switch and the time the electronic device is powered. For this design case, two seconds was used. Although this design case uses two seconds as an optimal waiting time, the time period may be lengthened or shortened without departing from the scope and spirit of the present invention. Finally, a continuous groove width of greater than about 85 μm is desirable to maintain the Mach number below about 0.15. Therefore the continuous groove width is optimized between about 235 and about 295 μm. Treating the various factors equally, the minimization of both transit time and heat loss occurs at their point of intersection, which is nearest the continuous groove width of about 255 μm. Thus, this design case has an optimized continuous groove width of about 255 μm.

FIG. 7 illustrates a microreformer system according to some embodiments of the present invention. Microreformer system 100 comprises microreformer assembly 10, which has previously been described. Microreformer assembly 100 may further comprise fuel cartridge 110, inlet fuel line 70, micro fuel cell 135, and outlet fuel line 75.

Fuel cartridge 110 comprises fuel chamber 112 for storing fuel supply 120, pressurization system 115 for maintaining fuel supply 120 at a pre-selected pressure and control valve 125 coupled to the outlet of fuel cartridge 110. Pressurization system 115 used in some embodiments is a propellant. Although some embodiments use a propellant for pressurization system 115, other pressurization systems may be used, including a spring energized piston, gravitational force and other systems capable of producing the pre-selected pressure and force fuel supply 120 to travel downstream, without departing from the scope and spirit of the present invention. The pre-selected pressure maintained within fuel cartridge 110 is about 1.06 MPa. Although about 1.06 MPa is used as the pre-selected pressure, other pre-selected pressures may be used so long that the downstream equipment is designed for it, without departing from the scope and spirit of the present invention. Possible pre-selected pressures may range from about 0.2 MPa to about 900,000 MPa. Also, a MEMS valve is used as control valve 125 in some embodiments. Although some embodiments utilize a single control valve, an array of control valves may be used without departing from the scope and spirit of the present invention.

Inlet fuel line 70 has inlet end 72 and outlet end 73. Inlet end 72 is coupled to control valve 125 of fuel cartridge 110, while outlet end 73 is coupled to microreformer assembly 10. Outlet fuel line 75 has entrance end 77 and exit end 78. Entrance end 77 is coupled to microreformer assembly 10, while exit end 78 is coupled to micro fuel cell 135, which generates electrical power for a device. Flow metering device 130 for controlling control valve 125 may be installed on inlet fuel line 70. Although some embodiments have flow metering device 130 located on inlet fuel line 70, flow metering device 130 may be located on outlet fuel line 75 without departing from the scope and spirit of the present invention. Some embodiments use an orifice for flow metering device 130. Although some embodiments use an orifice as flow metering device 130, any flow measuring device may be used without departing from the scope and spirit of the present invention.

Figure 8:
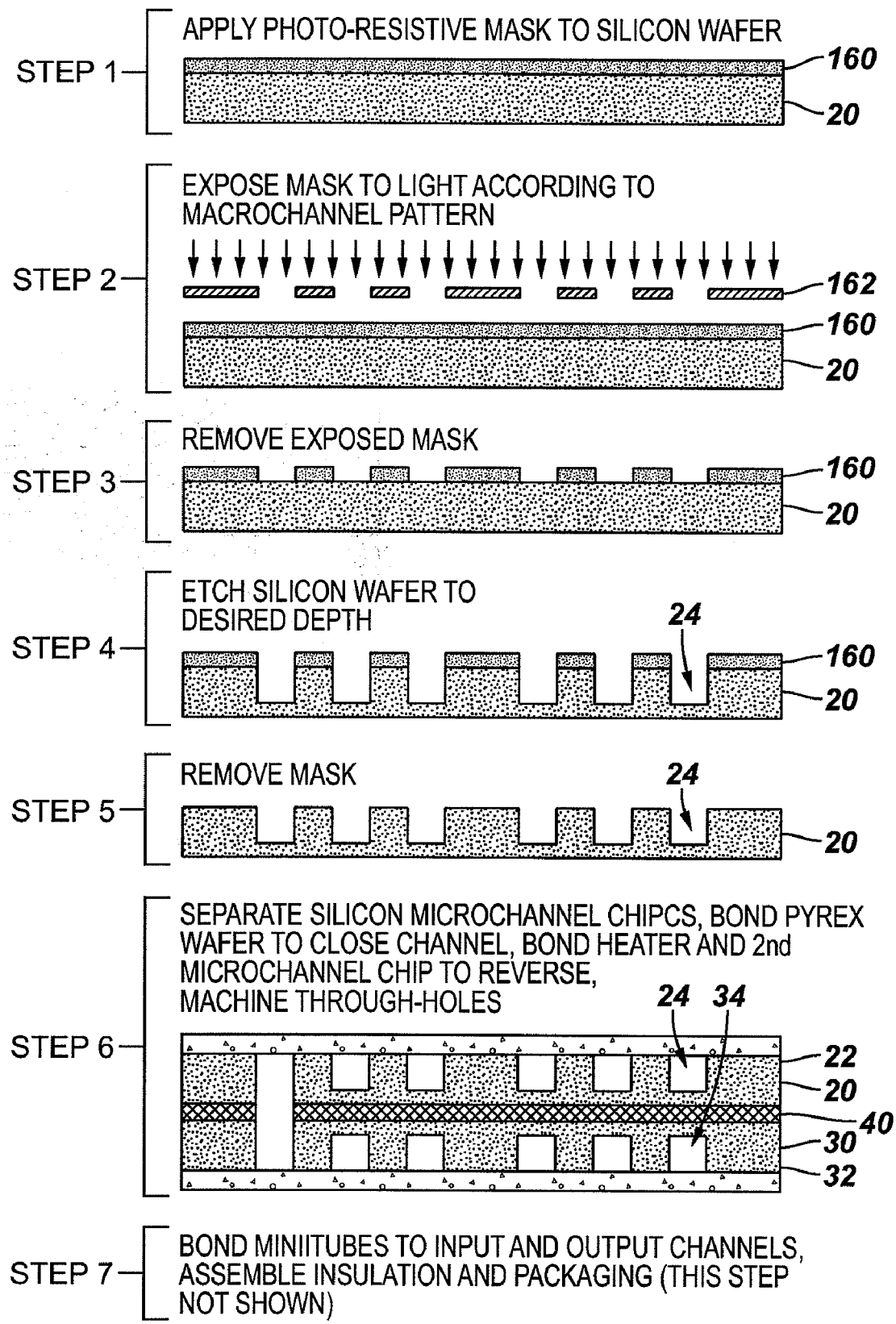
FIG. 8 illustrates a method of fabricating the microchannel configuration of the spiral microchannel according to some embodiments of the present invention.

FIG. 8 illustrates a method of fabricating the microchannel configuration of the spiral microchannel according to some embodiments of the present invention.

According to some embodiments of the present invention, a photo-resistive mask 160 is applied to both the surface of first microchannel 20 and the surface of second microchannel 30 (FIG. 2), as shown in step 1. Mask 160 is then exposed to light, in step 2, according to desired pattern 162 for first microchannel 20 and second microchannel 30 (FIG. 2). In step 3, the exposed portion of mask 160 is removed. Step 4 illustrates etching first continuous groove 24 and second continuous groove 34 (FIG. 2) to a desired depth. Step 5 shows removal of the remaining mask 160. In step 6, first seal 50 (FIG. 2) and second seal 60 (FIG. 2) is coupled to first grooved surface 22 and second grooved surface 32, respectively, so that first continuous groove 24 and second continuous groove 34 are sealed. Patch heater 40 is then coupled to first microchannel 20 and second microchannel 30 on the surface side opposite to first grooved surface 22 and second grooved surface 32. The through-holes (not shown) are then machined so that fluid may flow from first continuous groove 24 to second continuous groove 34. In step 7, the inlet fuel line 75 is coupled to the inlet of first continuous groove 24 and the outlet fuel line 75 is coupled to the output of second continuous groove 34. First insulation 52 (FIG. 2), second insulation 62 (FIG. 2), first exterior packaging 54 (FIG. 2) and second exterior packaging 64 (FIG. 2) are then assembled. Although FIG. 8 shows one method of manufacturing microreformer assembly 10 (FIG. 2), other methods may be used that are consistent with other embodiments that have been described, such as when first microchannel 20 and second microchannel 30 are oriented in a parallel configuration, without departing from the scope and spirit of the present invention.

Referring primarily to FIGS. 2 and 7, the operation of microreformer system 100 may be described. Once microreformer system 100 is set into operation, it continuously operates until the operator presses a switch (not shown). However, to initially start microreformer system 100, the operator must press the switch (not shown) which activates a small battery (not shown). This small battery (not shown) heats up an auxiliary heater (not shown), which then temporarily reforms the fuel. Once operation has began, the auxiliary heater (not shown) stops working and patch heater 40 takes over.

In the present design for some embodiments, it is desirable that the fuel supply 120 pressure is relatively constant at about 1.06 MPa and the mass flow rate is relatively constant at about $1.46 \times 10^{-7}$ kg/s, which is about 0.6074 cc/hour when the fuel is in its liquid state. Pressurized fuel cartridge 110 supplies the about 1:1 molar water-methanol mixture at a static pressure of about 1.06 MPa, a value equivalent to about 15% of the capability of commercial $CO_2$ cartridges. Upon activation via a device switch (not shown), control valve 125 opens to allow fuel supply 120 to flow towards microreformer assembly 10 via inlet fuel line 70. As fuel 120 exits fuel cartridge 110, pressurization system 115 operates to ensure that relatively constant pressure is maintained within fuel cartridge 110.

While flowing through inlet fuel line 70, fuel 120 flow rate is measured via flow metering device 130. The flow metering device regulates the flow by opening and closing control valve 125. Fuel 120 then enters heated microreformer assembly 10 at location substantially in the center of first microchannel 20. While in microreformer assembly 10, fuel 120 experiences four distinct regions: liquid pre-heating, phase change, vapor superheating, and the catalyzed reactor.

Preheat region occurs in first microchannel 20 for a distance of about 0.04 mm. Fuel 120 enters first continuous groove 24 at about 20° C., wherein fuel 120 is in a liquid state. This region consists of heating incoming liquid fuel 120 from room temperature up to the boiling point of the mixture, which is about 77.34° C. The heat desired for this preheat region is about 0.026 W.

Fuel 120 then enters the phase change region, which occurs for a distance of about 4.1 cm, also in first microchannel 20. The temperature during this phase change remains substantially constant at about 77.34° C., the boiling point. This zone consists of converting liquid fuel 120 at the boiling point to saturated vapor fuel 120 at the boiling point. The about 1:1 molar mixture of water and methanol is directly heated by the three surface sides of first continuous groove 24. The heat desired for this phase change region is about 0.22 W. The expected flow regime is that of a vapor core surrounded by a liquid film covering the channel surfaces until the film finally disappears as the vapor quality reaches 100%.

Saturated vapor fuel 120 then enters the superheat region, which occurs for a distance of about 2.8 cm, also in first microchannel 20. Within this region the temperature of saturated vapor fuel 120 increases from about 77.34° C. to about 200° C., which is now superheated vapor. The heat desired for this superheat region is about 0.030 W.

Superheated vapor fuel 120 then enters the catalytic reactor region, which occurs for a total distance of about 4.1 m, about 2.0 m within first microchannel 20 and about 2.1 m within second microchannel 30. This zone consists of chemically converting the superheated vapor mixture of methanol and water into a mixture of hydrogen and carbon dioxide. The dwell time of the vapor mixture in the presence of Cu/ZnO catalyst 26 is one of the main factors. In some design embodiments, the dwell time has been determined to be about 750 milliseconds. Here, the mixture's properties, including density, speed of sound, viscosity, as well as other properties, are changing. The relevant chemical reactions that occur during this region for the production of hydrogen from methanol are detailed below:

$$CH_3OH+H_2O \rightarrow CO_2+3H_2$$

$$CH_3OH \rightarrow CO+2H_2$$

$$CO+H_2O \rightarrow CO_2+H_2$$

$$CO+\tfrac{1}{2}O_2 \rightarrow CO_2$$

This reaction is an endothermic reaction, and thus requires heat to sustain this reaction: $q_{chem}=59.17$ kJ/kmol. At the designed mass flow rates, the heat desired is about 0.17 W.

The values for the distance the fuel travels and the heat desired for each region is based upon the specific design case. As the design is altered, these distances and values may increase or decrease without departing from the scope and spirit of the present invention.

The hydrogen gas and the carbon dioxide then exit microreformer assembly 10 via outlet fuel line 75 and flow to micro fuel cell 135. Micro fuel cell 135 transforms the provided hydrogen gas into $H_2O$ with the available atmospheric oxygen and produces electrical power sufficient to drive the patch heater 40 of microreformer assembly 10 and power the electrical device (not shown).

Once fuel supply 120 has been depleted, the device's operator may replenish fuel supply 120 by replacing fuel cartridge 110. Alternatively, since microreformer assembly 10 may also desire replacement, fuel cartridge 110 and microreformer assembly 10 may both be replaced as an integrated or non-integrated unit.

An iterative, implicit, finite element solution code, which locates the boundaries between liquid, two-phase, and gaseous flow, provides a complete solution of the fuel and heat transfer properties throughout the device. The solution employs experimentally verified microchannel fluid dynamics relations to develop accurate results. Based on analysis of some embodiments of the present invention, which utilizes a water-methanol mixture, proposed microreformer assembly 10 design may have a thermal efficiency of about 42%, with a theoretical maximum thermal efficiency of about 70%. Increased insulation, and therefore, overall size may be traded for increases in thermal efficiency for use in different applications. In some embodiments, the total gross power generated is approximately 1.5 W. Approximately 0.446 W are used to heat and convert the water-methanol mixture to hydrogen; while the remaining generated power is lost to the environment.

A microchannel methanol-steam microreformer, according to some embodiments of the present invention, is designed to provide power in conjunction with a micro fuel cell for a portable, low-power device. Detailed finite element analysis of the microreformer configuration has demonstrated its feasibility as part of a power system for small portable electronic devices. This design is optimized for low pumping power and rapid operation as well as thermal efficiency, overall size, and complete generation of the available hydrogen.

Microreformer assembly 10 is based on silicon microchannel technology, which permits detailed design and optimization of groove geometry at very small scales on the order of 10's of μm. Photolithography processes for the production of microchannel devices are proven and easily scalable for inexpensive mass production. Microreformer assembly 10 groove design provides adequate surface area for complete hydrogen generation, maintains a compact overall device size, and reduces pressure drop to feasible ranges. For these purposes, the spiral channel proved superior by, for example, reducing the predicted pressure drop under normal operating conditions by approximately 74%.

Although the invention has been described with reference to specific embodiments, these descriptions are not meant to be construed in a limiting sense. Various modifications of the disclosed embodiments, as well as alternative embodiments of the invention may become apparent to persons skilled in the art upon reference to the description of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. It is therefore, contemplated that the claims may cover any such modifications or embodiments that fall within the true scope of the invention.

What is claimed is:

1. A microreformer assembly comprising:
   a first microchannel comprising a first grooved surface;
      wherein the first grooved surface comprises a first continuous groove in a spiral configuration defined in a first plane;
   a second microchannel comprising a second grooved surface;
      wherein the second grooved surface comprises a second continuous groove in a spiral configuration defined in a second plane;
      wherein the second microchannel is in fluid communication with the first microchannel, a fuel pathway through the first microchannel and the second microchannel is in series, through a center of the spiral configuration of the first microchannel flowing outwardly to a perimeter of the first microchannel and into a perimeter of the second microchannel toward a center of the spiral configuration of the second microchannel, and said fuel pathway is unidirectional through the first microchannel and the second microchannel; and
   wherein the first microchannel comprises a first catalyst coupled to an interior side of the first continuous groove.

2. The microreformer assembly of claim 1, wherein the first continuous groove emanates outwardly.

3. The microreformer assembly of claim 2, wherein the first continuous groove increases in width as the first continuous groove emanates outwardly.

4. The microreformer assembly of claim 3, wherein the first catalyst comprises copper-zinc oxide.

5. The microreformer assembly of claim 3, wherein the first catalyst comprises an array of nanotubes.

6. The microreformer assembly of claim 3, wherein the first catalyst comprises a bundle of nanotubes.

7. The microreformer assembly of claim 1, wherein the second microchannel comprises a second catalyst coupled to an interior side of the second continuous groove.

8. The microreformer assembly of claim 7, wherein the second catalyst comprises copper-zinc oxide.

9. The microreformer assembly of claim 7, wherein the second catalyst comprises an array of nanotubes.

10. The microreformer assembly of claim 7, wherein the second catalyst comprises a bundle of nanotubes.

11. The microreformer assembly of claim 1, further comprising:
    a patch heater coupled to the first microchannel on a surface opposite of the first grooved surface and coupled to the second microchannel on a surface opposite of the second grooved surface;
    a first seal coupled to the first microchannel on the first grooved surface;
    a first insulation coupled to the first seal;
    a second seal coupled to the second microchannel on the second grooved surface;
    a second insulation coupled to the second seal;
    a first exterior packaging;
    a second exterior packaging;
       wherein the second exterior packaging is coupled to the first exterior packaging; and wherein the first exterior packaging and the second exterior packaging are disposed so as to enclose the first insulation, the first seal, the first microchannel, the patch heater, the second microchannel, the second seal and the second insulation into a portable assembly;
an inlet fuel line coupled to the first continuous groove; and
an outlet fuel line coupled to the second continuous groove.

12. The microreformer assembly of claim 11, wherein the first seal comprises a first glass wafer and the second seal comprises a second glass wafer.

13. The microreformer assembly of claim 1, wherein the first continuous groove is rectangularly shaped.

14. The microreformer assembly of claim 1, further comprising:
an inlet fuel line;
wherein the inlet fuel line is coupled to an entrance of the first continuous groove and an entrance of the second continuous groove; and
an outlet fuel line;
wherein the outlet fuel line is coupled to an exit of the first continuous groove and an exit of the second continuous groove.

15. A portable microreformer assembly comprising:
a first microchannel comprising a first grooved surface;
wherein the first grooved surface comprises a first continuous groove in a spiral configuration defined in a first plane;
wherein the first continuous groove emanates outwardly;
a second microchannel comprising a second grooved surface;
wherein the second grooved surface comprises a second continuous groove in a spiral configuration defined in a second plane;
wherein the second continuous groove emanates outwardly;
wherein the second microchannel is in fluid communication with the first microchannel, and a fuel pathway through the first microchannel and the second microchannel is in series, through a center of the spiral configuration of the first microchannel flowing outwardly to a perimeter of the first microchannel and into a perimeter of the second microchannel toward a center of the spiral configuration of the second microchannel, and said fuel pathway is unidirectional through the first microchannel and the second microchannel;
a first catalyst coupled to an interior side of the first continuous groove;
a second catalyst coupled to an interior side of the second continuous groove;
a patch heater coupled to the first microchannel on a surface opposite of the first grooved surface and coupled to the second microchannel on a surface opposite of the second grooved surface;
a first seal coupled to the first microchannel on the first grooved surface;
a first insulation coupled to the first seal;
a second seal coupled to the second microchannel on the second grooved surface;
a second insulation coupled to the second seal;
a first exterior packaging;
a second exterior packaging;
wherein the second exterior packaging is coupled to the first exterior packaging; and
wherein the first exterior packaging and the second exterior packaging are disposed so as to enclose the first insulation, the first seal, the first microchannel, the patch heater, the second microchannel, the second seal and the second insulation into a portable assembly;
an inlet fuel line coupled to the first continuous groove; and
an outlet fuel line coupled to the second continuous groove.

16. A microreformer system comprising:
a microreformer assembly;
wherein the microreformer assembly comprises a first microchannel comprising a first grooved surface;
wherein the first grooved surface comprises a first continuous groove in a spiral configuration defined in a first plane; and
a second microchannel comprising a second grooved surface;
wherein the second grooved surface comprises a second continuous groove in a spiral configuration defined in a second plane;
wherein the second microchannel is in fluid communication with the first microchannel, and a fuel pathway through the first microchannel and the second microchannel is in series, through a center of the spiral configuration of the first microchannel flowing outwardly to a perimeter of the first microchannel and into a perimeter of the second microchannel toward a center of the spiral configuration of the second microchannel, and said fuel pathway is unidirectional through the first microchannel and the second microchannel.

17. The microreformer system of claim 16, further comprising:
a fuel cartridge comprising:
a fuel chamber adapted for storing a fuel supply,
a pressurization system adapted for maintaining the fuel supply at a pre-selected pressure, and
a control valve located at an outlet of the fuel cartridge;
an inlet fuel line having an inlet end and an outlet end;
wherein the inlet end is coupled to the control valve and the outlet end is coupled to the microreformer assembly;
a micro fuel cell for generating electrical power; and
an outlet fuel line having an entrance end and an exit end;
wherein the entrance end is coupled to the microreformer assembly and the exit end is coupled to the micro fuel cell.

18. The microreformer system of claim 17, further comprising a member adapted for recycling a portion of the generated electrical power to the microreformer assembly.

19. The microreformer system of claim 17, wherein the pressurization system comprises a propellant.

20. The microreformer system of claim 17, wherein the pressurization system comprises a spring energized piston.

21. The microreformer system of claim 17, wherein the control valve comprises a micro electromechanical system valve.

22. The microreformer system of claim 17, further comprising a flow metering device located along the inlet fuel line;
wherein the flow metering device is adapted for controlling the control valve.

23. The microreformer system of claim 22, wherein the flow metering device comprises an orifice.

24. The microreformer system of claim 17, further comprising a flow metering device located along the outlet fuel line;

wherein the flow metering device is adapted for controlling the control valve.

25. The microreformer system of claim 24, wherein the flow metering device comprises an orifice.

26. The microreformer system of claim 17, wherein the fuel supply comprises a water-alcohol mixture.

27. The microreformer system of claim 26, wherein the water-alcohol mixture comprises about a 1:1 mole ratio.

28. The microreformer system of claim 26, wherein the alcohol comprises methanol.

29. The microreformer system of claim 26, wherein the alcohol comprises ethanol.

* * * * *